July 20, 1926.
D. C. PRINCE
1,593,355
SYSTEM OF DISTRIBUTION
Filed July 13, 1923
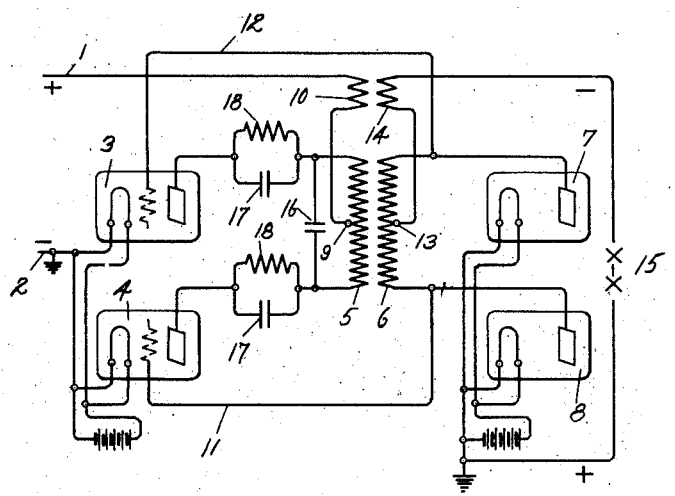
Inventor:
David C. Prince,
by *[signature]*
His Attorney.

Patented July 20, 1926.

1,593,355

UNITED STATES PATENT OFFICE.

DAVID C. PRINCE, OF SCHENECTADY, NEW YORK, ASSIGNOR TO GENERAL ELECTRIC COMPANY, A CORPORATION OF NEW YORK.

SYSTEM OF DISTRIBUTION.

Application filed July 13, 1923. Serial No. 651,410.

My present invention relates to systems of electrical distribution in which it is desired to change direct current of one voltage to direct current of another voltage.

In systems involving the transmission of large amounts of electrical energy for considerable distances it has become customary to employ high voltage alternating currents. One of the advantages of such a system which renders it peculiarly suitable for electrical power distribution is the comparative simplicity of the apparatus required for transforming the low voltage current generated to high voltage for transmission and in turn transforming the high voltage current transmitted to a low voltage suitable for utilization.

It has long been recognized that a high voltage direct current transmission system would have certain advantages over an alternating current system, but it has not been possible to fully realize these advantages because of the impossibility of directly generating the high voltage desired and the lack of suitable apparatus for efficiently converting the transmitted high voltage direct current to a voltage suitable for utilization.

One of the objects of my invention is to provide a simple and efficient apparatus which is capable of converting direct current of any voltage to direct current of any other desired voltage, one of which voltages may be high enough to permit of the economical transmission of the direct current over long distances.

It has also been proposed to convert low voltage direct current to alternating current by means of electron discharge devices or thermionic valves, transform the alternating current to a high voltage, rectify the high voltage alternating current by thermionic rectifiers, transmit the rectified high voltage current to a distant point, there convert it to high voltage alternating current by the thermionic valve, and transform the high voltage alternating current to low voltage alternating current for direct utilization or for rectification to produce direct current of a desired voltage.

A further object of my invention is to provide apparatus whereby one or more of the steps referred to in the system described may be carried out more efficiently than has heretofore been possible.

In the operation of a rectifier, and also in a system for converting direct current to alternating, it is desirable that momentary fluctuations in the direct current during the periods when the path of flow of the current is changing should be avoided. This is usually accomplished by some form of series reactance. This reactance, unless the number of phases employed is four or more, is normally very large for the work which it has to do because of the fact that it is subjected to direct current saturation.

A further object of my invention is to provide a means whereby the size of the series reactance used may be greatly reduced.

The novel features which I believe to be characteristic of my invention are set forth with particularity in the appended claims. My invention itself, however, both as to its organization and method of operation, together with further objects and advantages thereof, will best be understood by reference to the following description taken in connection with the accompanying drawing in which I have shown diagrammatically one circuit organization whereby my invention may be carried into effect.

I have indicated in the drawing a system in which direct current from the mains 1 and 2 is supplied through the plate circuits of the thermionic valves 3 and 4 to the primary winding 5 of a transformer of the desired ratio of transformation having a secondary winding 6, the opposite terminals of which are connected to the anodes of thermionic rectifiers 7 and 8. Direct current main 1 is connected to the middle point 9 of winding 5 through reactance 10, and main 2 is connected to the cathodes of valves 3 and 4 so that current impulses supplied to the winding 5 by the two valves, flow in opposite directions through winding 5. The valves are controlled in the desired manner by means of voltages applied to their grids, which are supplied from the secondary winding 6 through the connecting leads 11 and 12. A load circuit to which the rectified current from rectifiers 7 and 8 is supplied, is connected from the middle point 13 of secondary 6 through reactance 14, and the load devices 15 to the cathodes of rectifiers 7 and 8.

The frequency of the oscillations produced may be determined by means of a condenser 16 connected across the primary winding 5. In the operation of a system of the type described it is necessary for efficient and satisfactory operation that current should be allowed to start in one valve before it is completely interrupted in the other valve, and that the current transfer should take place in advance of the point in the cycle at which the plates of valves 3 and 4 are at the same potential. Since the current from both grids flows between the grids and the cathodes of valves 3 and 4 through the ground, load circuit 15, inductance 14 and the transformer circuit 6, it is maintained substantially constant. Therefore, when the grids come to the same potential current flows momentarily in both of them. Current only flows in a grid when it is positive with respect to the cathode so that both tubes are automatically conducting during the transfer period. The plates of valves 3 and 4 are fed through condensers 17, which are shunted by high reactances 18 which carry the direct current component of plate current. The drop through condensers 17 is in quadrature lagging 90° behind the current so that when the tubes both become conducting there is still a potential difference between the anodes in the direction to stop the current in the tube about to be cut off and to start current in the tube which has just become conducting. The reactances 10 and 14 are in inductive relation, being wound upon a common core. When the potential wave generated in windings 5 and 6 is passing through zero, no voltage will be supplied to the rectifiers 7 and 8, and no counter-electromotive force will be supplied to the valves 3 and 4. Under these conditions the current in the output line tends to fall while the current in the input line tends to rise. These two tendencies are opposed to one another through the transformer 10—14, which should have the same ratio as the main transformer 5—6. Thus the lack of direct current voltage and counter electromotive force of the main transformer at this point is compensated for by the voltages induced in the transformer 10—14. At the same time the direct currents in the two windings 10 and 14 have an opposite magnetizing effect upon the core so that there is no direct current saturation effect, and transformer 10—14 may be made a comparatively small and compact device. The voltage effects are of the same nature through other parts of the cycle. Thus when the voltages in the transformer 5—6 are at their peak the voltage on the rectifiers is higher than that required by the load, and at the same time the counter-electromotive force is higher than the impressed electromotive force on the primary 5. The potentials in the windings 10—14 then operate in the opposite direction.

While I have shown and described only one embodiment of my invention it is apparent that my invention is not limited to the precise embodiment shown as many modifications in the manner of carrying my invention into effect may be made without departing from the scope thereof as set forth in the appended claims.

What I claim as new and desire to secure by Letters Patent of the United States is:—

1. The combination in a system of electrical distribution of a source of direct current, a primary winding connected to said source through a reactance and an electric valve, means for controlling the action of said valve to supply current impulses to said winding at predetermined intervals, a secondary winding inductively associated with said primary winding, and a rectifying device connected to said secondary winding and connected to a load circuit through a reactance which is inductively related to the first mentioned reactance.

2. The combination in a system of electrical distribution of a source of direct current, a primary winding connected to said source through a reactance and a plurality of electric valves, means for controlling the action of said valves to supply current impulses to said winding at predetermined intervals, a secondary winding inductively associated with said primary winding, and a rectifying device connected to said secondary winding, and connected to a load circuit through a reactance which is inductively related to the first mentioned reactance.

3. The combination in a system of electrical distribution of a source of direct current, a primary winding having its terminals connected to the anodes of a pair of electric valves and its mid point connected to said direct current source through a reactance, and a secondary winding inductively associated with said primary winding having its terminals connected to the anodes of a rectifying device, and its mid point connected to a load circuit through a reactance which is inductively related to the first-mentioned reactance.

In witness whereof, I have hereunto set my hand this 3rd day of July, 1923.

DAVID C. PRINCE.